US009725154B2

(12) United States Patent
Chin et al.

(10) Patent No.: US 9,725,154 B2
(45) Date of Patent: Aug. 8, 2017

(54) METHOD AND APPARATUS FOR REDUCING STRUCTURAL VIBRATION AND NOISE

(71) Applicant: The Boeing Company, Seal Beach, CA (US)

(72) Inventors: Cliff L. Chin, Fullerton, CA (US); Joshua M. Montgomery, Seattle, WA (US)

(73) Assignee: The Boeing Company, Chicago, IL (US)

( * ) Notice: Subject to any disclaimer, the term of this patent is extended or adjusted under 35 U.S.C. 154(b) by 530 days.

(21) Appl. No.: 14/276,703

(22) Filed: May 13, 2014

(65) Prior Publication Data

US 2016/0185442 A1  Jun. 30, 2016

(51) Int. Cl.
*B64C 1/40* (2006.01)
*F16F 9/30* (2006.01)
*G10K 11/168* (2006.01)
*B64C 1/00* (2006.01)

(52) U.S. Cl.
CPC ............... *B64C 1/40* (2013.01); *F16F 9/306* (2013.01); *G10K 11/168* (2013.01); *B64C 2001/0072* (2013.01); *B64C 2001/0081* (2013.01)

(58) Field of Classification Search
CPC .............. B64C 1/40; B64C 2001/0072; B64C 2001/0081; B64C 1/12; F16F 9/306; G10K 11/168; B32B 2307/56; B32B 2307/102; B32B 2307/51; B32B 5/26; B32B 2605/18; B32B 3/28; B32B 15/20; B60R 13/28; B60R 13/0815; E04B 2001/8461; E04B 2001/8433; E04B 2001/8495;

(Continued)

(56) References Cited

U.S. PATENT DOCUMENTS 1,327,509 A * 1/1920 Yarrow ..................... B63G 8/36
                                                        114/211
1,912,161 A * 5/1933 Rosenblatt ................ E04B 1/86
                                                        181/291

(Continued)

FOREIGN PATENT DOCUMENTS

FR   CA 2066241 A1 *  1/1992  ............... B63G 8/34
WO   9738237 A2       10/1997
WO   9745671 A1       12/1997

OTHER PUBLICATIONS

Extended European Search Report, dated Dec. 18, 2015, for co-pending EP patent application No. EP 15162435.0 (7 pgs.).

(Continued)

*Primary Examiner* — James Ference
(74) *Attorney, Agent, or Firm* — Armstrong Teasdale LLP (57) ABSTRACT

A conjugate damper for a structural panel includes a constraining sheet extending between a first edge and a second edge. Each of the first edge and the second edge is at least partially coupled to a first surface of the structural panel. The conjugate damper also includes a damping layer coupled between the constraining sheet and the first surface such that, when the structural panel is in a compressively deformed state, a thickness of the damping layer in a direction generally normal to the first surface is decreased relative to a baseline state. The damping layer includes a viscoelastic material.

17 Claims, 5 Drawing Sheets

(58) Field of Classification Search
CPC ...... E04B 2001/8485; E04B 1/84; E04B 1/82; E04B 1/98
USPC ......... 244/1 N, 1 R, 129.1, 119, 120, 117 R, 244/173.2
See application file for complete search history.

(56) References Cited

U.S. PATENT DOCUMENTS

| | | | | |
|---|---|---|---|---|
| 2,091,918 A * | 8/1937 | Finck | E04B 1/806 | 181/291 |
| 2,187,335 A * | 1/1940 | Wagner | B60R 13/02 | 428/162 |
| 2,326,581 A * | 8/1943 | Van Cleef | B61D 17/18 | 156/247 |
| 2,357,560 A * | 9/1944 | Taforo, Jr. | E04B 1/84 | 181/30 |
| 2,419,971 A * | 5/1947 | Rumpf | E04C 2/3405 | 181/290 |
| 2,576,698 A * | 11/1951 | Russum | F01B 17/04 | 138/149 |
| 2,887,173 A * | 5/1959 | Boschi | E04B 9/001 | 181/286 |
| 2,924,857 A * | 2/1960 | De Falco | E04B 1/86 | 181/290 |
| 3,215,225 A * | 11/1965 | Kirschner | B32B 15/08 | 181/290 |
| 3,640,830 A * | 2/1972 | Oberst | C08L 31/04 | 181/290 |
| 3,746,114 A * | 7/1973 | Sorber | G10K 11/16 | 181/256 |
| 3,814,208 A * | 6/1974 | Morresi | E04B 1/86 | 181/293 |
| 3,967,693 A * | 7/1976 | Okawa | G10K 11/172 | 181/284 |
| 4,137,992 A * | 2/1979 | Herman | F02K 1/827 | 181/213 |
| 4,244,439 A * | 1/1981 | Wested | E01F 8/0035 | 181/210 |
| 4,293,053 A * | 10/1981 | Shuttleworth | F02C 7/045 | 181/213 |
| 4,384,634 A * | 5/1983 | Shuttleworth | G10K 11/16 | 181/213 |
| 4,399,174 A * | 8/1983 | Tanaka | B60J 5/043 | 296/146.6 |
| 4,416,349 A * | 11/1983 | Jacobs | G10K 11/16 | 181/208 |
| 4,433,751 A * | 2/1984 | Bonneau | F02K 1/827 | 181/213 |
| 4,441,581 A * | 4/1984 | Sommerhalder | E04B 1/86 | 181/286 |
| 4,741,945 A * | 5/1988 | Brant | B32B 5/18 | 296/211 |
| 4,826,106 A * | 5/1989 | Anderson | B29D 24/007 | 181/214 |
| 4,848,514 A * | 7/1989 | Snyder | B32B 15/04 | 181/222 |
| 4,906,501 A * | 3/1990 | Honma | B32B 5/18 | 156/79 |
| 4,926,963 A * | 5/1990 | Snyder | B32B 15/04 | 181/213 |
| 5,014,815 A * | 5/1991 | Arcas | G10K 11/172 | 181/213 |
| 5,087,491 A * | 2/1992 | Barrett | B32B 7/02 | 248/560 |
| 5,256,223 A * | 10/1993 | Alberts | B62D 27/04 | 156/71 |
| 5,298,694 A * | 3/1994 | Thompson | B32B 5/02 | 181/286 |
| 5,300,355 A * | 4/1994 | Mifune | B32B 27/06 | 248/206.5 |
| 5,485,053 A * | 1/1996 | Baz | F16F 9/306 | 181/208 |
| 5,690,035 A * | 11/1997 | Hatayama | B61D 17/18 | 105/401 |
| 5,855,353 A * | 1/1999 | Shaffer | F16F 9/306 | 248/638 |
| 5,965,853 A * | 10/1999 | Hornsey | B32B 17/10018 | 181/208 |
| 6,021,612 A * | 2/2000 | Dunn | E01F 8/007 | 181/286 |
| 6,251,493 B1 * | 6/2001 | Johnson | F16F 1/37 | 428/220 |
| 6,287,664 B1 * | 9/2001 | Pratt | B29C 70/20 | 428/174 |
| 6,669,553 B2 * | 12/2003 | Adams | F24F 13/24 | 454/237 |
| 6,677,034 B1 * | 1/2004 | Hooley | B06B 1/0603 | 102/303 |
| 6,688,439 B2 * | 2/2004 | Bhattacharya | F01D 25/04 | 188/267 |
| 6,700,304 B1 * | 3/2004 | Fuller | B32B 3/28 | 181/208 |
| 6,764,754 B1 * | 7/2004 | Hunter | B29C 70/30 | 427/386 |
| 6,765,335 B2 * | 7/2004 | Wischnewskiy | H01L 41/0986 | 310/323.02 |
| 6,907,736 B2 * | 6/2005 | Ohnishi | F23R 3/002 | 60/725 |
| 7,159,923 B2 * | 1/2007 | Rajasingham | A61G 3/0808 | 296/65.11 |
| 7,318,873 B2 * | 1/2008 | Czaplicki | B29C 70/70 | 156/293 |
| 7,419,031 B2 | 9/2008 | Liguore et al. | | |
| 7,513,082 B2 * | 4/2009 | Johnson | E04B 2/7412 | 52/144 |
| 7,523,603 B2 * | 4/2009 | Hagen | F01K 21/047 | 422/607 |
| 7,618,306 B2 * | 11/2009 | Felipe, Sr. | B24B 7/20 | 451/28 |
| 7,837,147 B2 | 11/2010 | Liguore et al. | | |
| 7,987,645 B2 * | 8/2011 | Tinianov | E04C 2/20 | 181/290 |
| 8,138,908 B2 * | 3/2012 | Rajasingham | B60N 2/42736 | 296/65.11 |
| 8,240,677 B2 * | 8/2012 | Browne | E05B 47/0009 | 277/628 |
| 8,376,261 B2 * | 2/2013 | Chow | B64C 7/00 | 244/1 N |
| 2002/0044668 A1 * | 4/2002 | Azima | H04R 7/045 | 381/152 |
| 2002/0104288 A1 * | 8/2002 | O'Sullivan | B31F 1/20 | 52/782.1 |
| 2003/0019170 A1 * | 1/2003 | Donnelly | E01F 8/0011 | 52/144 |
| 2005/0019590 A1 * | 1/2005 | Josefsson | B32B 15/06 | 428/457 |
| 2005/0098379 A1 * | 5/2005 | Sato | B60R 13/0815 | 181/293 |
| 2005/0194210 A1 * | 9/2005 | Panossian | B32B 3/12 | 181/293 |
| 2005/0211839 A1 * | 9/2005 | Movsesian | B32B 3/22 | 244/119 |
| 2006/0208135 A1 * | 9/2006 | Liguore | B29C 70/088 | 244/117 R |
| 2006/0284014 A1 * | 12/2006 | Muller | A62C 2/06 | 244/119 |
| 2007/0003733 A1 * | 1/2007 | Muller | A62C 2/06 | 428/73 |
| 2007/0018042 A1 * | 1/2007 | Muller | B64C 1/40 | 244/117 R |
| 2007/0069080 A1 * | 3/2007 | Rassaian | B64C 1/1484 | 244/129.3 |
| 2007/0102239 A1 * | 5/2007 | Liguore | B32B 3/12 | 181/292 |
| 2007/0199273 A1 * | 8/2007 | Wang | E04B 2/08 | 52/604 |
| 2007/0246296 A1 * | 10/2007 | Xiao | B32B 1/00 | 181/290 |

(56) References Cited

U.S. PATENT DOCUMENTS

| | | | |
|---|---|---|---|
| 2007/0284185 A1* | 12/2007 | Foss | F16F 15/0237 181/207 |
| 2008/0065245 A1* | 3/2008 | Tang | H05K 7/20172 700/94 |
| 2008/0277057 A1* | 11/2008 | Montgomery | B32B 5/26 156/307.1 |
| 2008/0314680 A1* | 12/2008 | Doneux | E04B 2/7409 181/290 |
| 2009/0065290 A1* | 3/2009 | Kim | E04B 1/86 181/141 |
| 2010/0021686 A1* | 1/2010 | Groussard | E04C 2/296 428/138 |
| 2010/0108437 A1* | 5/2010 | Bayle | B60R 13/02 181/286 |
| 2010/0129589 A1* | 5/2010 | Senibi | B32B 5/18 428/71 |
| 2010/0133039 A1* | 6/2010 | Liguore | B32B 5/26 181/294 |
| 2011/0031055 A1* | 2/2011 | Rajasingham | B60N 2/4235 180/271 |
| 2011/0139542 A1* | 6/2011 | Borroni | B32B 3/266 181/290 |
| 2011/0226897 A1* | 9/2011 | Padavano | B64G 1/66 244/1 N |
| 2012/0125710 A1* | 5/2012 | Fisk | B32B 15/06 181/290 |
| 2012/0164907 A1* | 6/2012 | Restuccia | B32B 5/022 442/381 |
| 2012/0269998 A1* | 10/2012 | Takahashi | B21D 13/10 428/34.1 |
| 2013/0126267 A1* | 5/2013 | Mathur | B64C 1/066 181/284 |
| 2016/0185442 A1* | 6/2016 | Chin | B64C 1/40 244/133 |

OTHER PUBLICATIONS

Leroy, Pierre et al., "Smart Foams" for Enhancing Acoustic Absorption, Proceedings of Acoustics'08 (2008), Jul. 2 and 5, 2008, Paris, France, retrieved from website www.acoustics.org/press/155th/leroy.htm (7 pgs).

Leroy, Pierre et al., "Experimental study of a smart foam sound absorber," J. Acoust. Soc. Am., vol. 129, No. 1 (2011) pp. 154-164.

\* cited by examiner

METHOD AND APPARATUS FOR REDUCING STRUCTURAL VIBRATION AND NOISE

BACKGROUND

The field of the disclosure relates generally to vibration and acoustic noise reduction, and, more particularly, to methods and apparatus for damping vibration of, and acoustic transmission through, an aircraft or vehicle structure.

Many structures are subjected to structure-borne vibrations and acoustic noise from various sources. For one example, aircraft and vehicle structures typically include engines that produce vibration and acoustic noise during operation. Such structures also typically are subjected to other vibratory and/or acoustic sources, such as those generated by aerodynamic forces. As a result, many such structures include systems intended to inhibit structural vibration and acoustic noise from reaching a passenger cabin. However, at least some such systems require separate devices to damp structure-borne vibration and to absorb acoustic noise.

For example, at least some known aircraft and vehicle structures are provided with constrained layer damping devices, in which one side of a layer of vibration damping material, such as a sheet of rubber or polyurethane, is coupled to the structural surface and an opposing side is coupled to a constraining layer. For a vibratory deformation at any location in the damping layer, the constraining layer induces shear deformation within the damping layer in directions parallel to the structural surface. The induction of shear deformation in the damping layer correspondingly dissipates a portion of the vibrational energy. However, such known constrained layer damping devices provide damping that varies significantly with the vibration frequency and the environmental temperature, and they provide little absorption of air-borne noise. Some known constrained layer damping devices use a viscoelastic foam damping layer to improve the frequency and temperature range for effective damping, but such devices still dissipate energy only to the extent that shear deformation is induced in the damping layer parallel to the structural surface.

Moreover, at least some known aircraft and vehicle structures are provided with thermal-acoustic blankets positioned between the structure and a panel of the passenger cabin. The blankets include a material, such as fiberglass or lightweight open-cell foam, that absorbs air-borne noise. However, such known blankets provide little damping of structure-borne vibrations.

Additionally, at least some known structures use a sound-absorbing foam with an embedded actuator, sometimes referred to as "smart foam." Such known smart foam devices include a layer of light-weight foam with a flat base and an opposing arcuate upper surface. The flat base is coupled to the structure and the arcuate surface is coupled to a thin piezoelectric film. To supplement the acoustic noise absorption provided by the foam, the piezoelectric film is actively controlled to expand and contract the foam to produce acoustic waves that cancel acoustic noise. However, most, if not all, of the deformation in the foam, normal to the structural surface, is actively induced by the piezoelectric film to generate noise-cancelling acoustic waves. Moreover, the foam is selected for its ability to provide an elastic support foundation for the actively controlled vibration of the flimsy piezoelectric film and to absorb acoustic energy. Consequently, the induction of deformation in the foam does not dissipate substantial vibrational energy from structure-borne vibrations. In addition, the piezoelectric film and active control system introduce an additional cost, weight, and complexity to the noise reduction device, for example, from auxiliary control components.

BRIEF DESCRIPTION

In one aspect, a conjugate damper for a structural panel is provided. The conjugate damper includes a constraining sheet extending between a first edge and a second edge. Each of the first edge and the second edge is at least partially coupled to a first surface of the structural panel. The conjugate damper also includes a damping layer coupled between the constraining sheet and the first surface such that, when the structural panel is in a compressively deformed state, a thickness of the damping layer in a direction generally normal to the first surface is decreased relative to a baseline state. The damping layer includes a viscoelastic material.

In another aspect, a structural panel is provided. The panel includes a first surface and at least one conjugate damper coupled to the first surface. The at least one conjugate damper includes a constraining sheet extending between a first edge and a second edge. Each of the first edge and the second edge is at least partially coupled to the first surface. The conjugate damper also includes a damping layer coupled between the constraining sheet and the first surface such that, when the structural panel is in a compressively deformed state, a thickness of the damping layer in a direction generally normal to the first surface is decreased relative to a baseline state. The damping layer includes a viscoelastic material.

In another aspect, a method of reducing structural vibration and noise transmission in a structural panel is provided. The method includes coupling a first edge of a constraining sheet at least partially to a first surface of the structural panel, and coupling a second edge of the constraining sheet at least partially to the first surface. The method also includes providing a damping layer with a viscoelastic material, and coupling the damping layer between the constraining sheet and the first surface such that, when the structural panel is in a compressively deformed state, a thickness of the damping layer in a direction generally normal to the first surface is decreased relative to a baseline state.

DETAILED DESCRIPTION

The methods and apparatus described herein provide for a reduction of both structure-borne vibrations and acoustic noise transmission by a structural panel. The methods and apparatus provide a conjugate damper that induces deformation within a damping layer in a direction generally normal to a panel surface, as well as in directions parallel to the panel surface, in response vibration of the panel. This "conjugate" deformation, that is, deformation of the damping layer normal to the panel surface, results in a greater use of the deformation potential of a given weight of damping material, and thus facilitates dissipating an increased proportion of vibrational energy present in the panel. The dissipation is effective across a wide range of non-acoustic and acoustic frequencies, and over a wide range of temperatures. In addition, the methods and apparatus described herein provide this enhanced damping in a passive fashion, with no need for active control systems and actuators.

Figure 1:
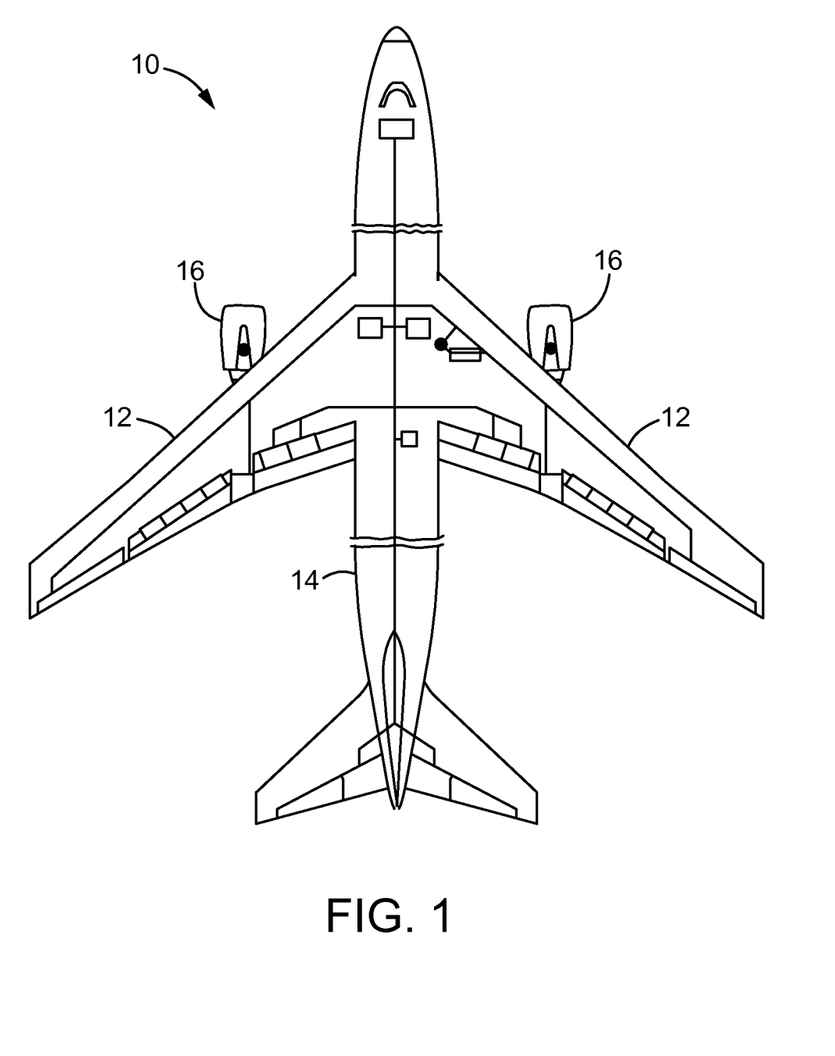
FIG. 1 is a schematic diagram of an example aircraft on which embodiments of a conjugate damper may be used.

Referring more particularly to the drawings, implementations of the disclosure may be described in the context of a structure such as an aircraft 10 shown schematically in FIG. 1. It should be understood, however, that the disclosure applies equally to other structures, including but not limited to automobiles, heavy work vehicles, other vehicles, aquatic vessels, and machinery in general.

Various components of aircraft 10, such as, but not limited to, wings 12 and fuselage 14, are subject to structure-borne vibrations and acoustic noise. For example, engines 16 generate structure-borne vibrations and acoustic noise at various amplitudes and frequencies, depending upon a stage of operation. In addition, aerodynamic forces (not shown) encountered by aircraft 10 generate structure-borne vibrations and acoustic noise at various amplitudes and frequencies.

Figure 2:
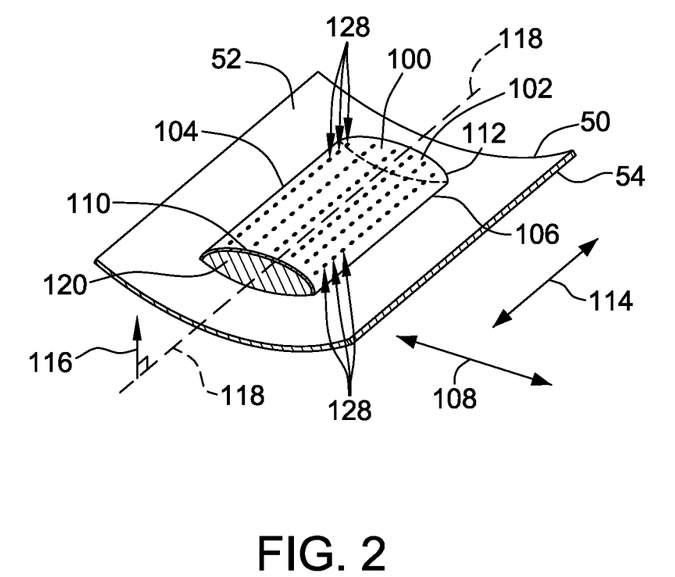
FIG. 2 is a perspective view of an embodiment of a conjugate damper coupled to an embodiment of a structural panel.
Figure 3:
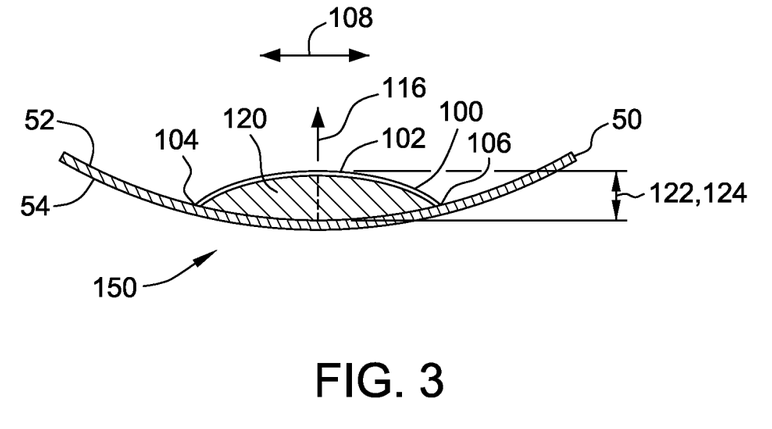
FIG. 3 is a schematic illustration of a cross-section of the conjugate damper of FIG. 2 coupled to the structural panel of FIG. 2 in baseline state.

FIG. 2 is a perspective view of an embodiment of a conjugate damper 100 coupled to a structural panel 50. FIG. 3 is a schematic illustration of a cross-section of conjugate damper 100 coupled to structural panel 50. In an embodiment, structural panel 50 is a component of fuselage 14 of aircraft 10. In another embodiment, structural panel 50 is a component of one of wings 12. Alternatively, structural panel 50 is a component of any structure that is subject to vibration and/or acoustic noise. In the illustrated embodiment, structural panel 50 has a curved panel configuration. Alternatively, structural panel 50 has a flat panel configuration.

With reference to FIG. 2 and FIG. 3, in the illustrated embodiment, conjugate damper 100 is coupled to a first surface 52 of structural panel 50. Panel 50 also includes a second surface 54 opposite first surface 52. Conjugate damper includes a constraining sheet 102. Constraining sheet 102 extends in a first direction 108 between a first edge 104 and a second edge 106. Moreover, each of first edge 104 and second edge 106 is at least partially coupled to first surface 52. In an embodiment, constraining sheet 102 has a generally curved or arcuate cross-section along first direction 108. In alternative embodiments, constraining sheet 102 may have a substantially flat cross-section along first direction 108. However, constraining sheet 102 is generally not concentric with or parallel to first surface 52 along first direction 108.

In an embodiment, constraining sheet 102 is adhered to first surface 52 along substantially an entire extent of first edge 104 and second edge 106. In other embodiments, constraining sheet 102 is adhered to first surface 52 only along a partial extent of at least one of first edge 104 and second edge 106. Any suitable adhesive may be used which enables conjugate damper 100 to function as described herein. In alternative embodiments, constraining sheet 102 is coupled to first surface 52 along first edge 104 and second edge 106 using suitable fasteners.

Constraining sheet 102 also extends between a third edge 110 and a fourth edge 112 in a second direction 114. Constraining sheet 102 is not coupled to first surface 52 along either of third edge 110 and fourth edge 112. In an alternative embodiment, at least one of third edge 110 and fourth edge 112 is a series of non-continuous edges along which constraining sheet 102 is not coupled to first surface 52.

In the illustrated embodiment, first edge 104 and second edge 106 are generally linear, and second direction 114 is generally transverse to first direction 108. Moreover, second edge 106 is generally oppositely disposed to first edge 104, and fourth edge 112 is generally oppositely disposed to third edge 110. However, in alternative embodiments, at least one of first edge 104 and second edge 106 is curved. For example, in an embodiment, constraining sheet 102 is a generally ovoid dome, first edge 104 forms a first segment of a perimeter of the dome, and second edge 106 forms a second segment of the perimeter of the dome, disposed generally opposite the first segment.

Although first surface 52 is curved in certain embodiments, a generalized surface normal direction 116 may be defined as a direction normal to first surface 52 at some location proximate to conjugate damper 100. For example, in the illustrated embodiment, surface normal 116 is a direction normal to first surface 52 along a longitudinal centerline 118 of conjugate damper 100.

In an embodiment, constraining sheet 102 is formed from a sheet of elastic material. In another embodiment, constraining sheet 102 is formed from a thin sheet of aluminum. In alternative embodiments, constraining sheet 102 is formed from any sheet material that enables conjugate damper 100 to function as described herein.

Conjugate damper 100 also includes a damping layer 120 coupled between first surface 52 and constraining sheet 102. Damping layer 120 has a thickness 122 in surface normal direction 116 that varies with a first distance 124 between constraining sheet 102 and first surface 52. Moreover, damping layer 120 is at least partially formed from a material that is viscoelastic. A viscoelastic material dissipates substantial mechanical energy under cyclic loading as compared to an elastic material. In addition, at least some viscoelastic materials tend to absorb vibration energy in a wide range of operation frequencies. In an embodiment, damping layer 120 is formed from a polyether-based polyurethane foam. In an alternative embodiment, damping layer 120 is formed from open-cell melamine foam. In alternative embodiments, damping layer 120 is formed from any material that enables conjugate damper 100 to function as described herein.

In an embodiment, damping layer 120 is adhered to first surface 52 over substantially an entire extent of its contact with first surface 52, and is adhered to constraining sheet 102 over substantially an entire extent of its contact with constraining sheet 102. In other embodiments, damping layer 120 is adhered to at least one of first surface 52 and constraining sheet 102 only over at least a portion of the extent of its contact with first surface 52 and constraining sheet 102, respectively. Any suitable adhesive may be used which enables conjugate damper 100 to function as described herein. In alternative embodiments, damping layer 120 is coupled to at least one of first surface 52 and constraining sheet 102 using suitable fasteners.

In the illustrated embodiment, damping layer 120 extends between first edge 104 and second edge 106 of constraining sheet 102 in first direction 108, and between third edge 110 and fourth edge 112 in second direction 114. In other embodiments, damping layer 120 extends only partially between third edge 110 and fourth edge 112, extends beyond at least one of third edge 110 and fourth edge 112, extends only partially between first edge 104 and second edge 106, or some combination thereof.

In a particular embodiment, constraining sheet 102 includes a plurality of perforations 128 extending therethrough. Perforations 128 are configured to facilitate absorption of acoustic waves by damping layer 120. More specifically, perforations 128 have a suitable size and spacing to facilitate acoustic waves passing through constraining layer 102 into damping layer 120, where they are absorbed by the viscoelastic material. In addition, perforations 128 result in a lower weight for constraining sheet 102 as compared to a non-perforated constraining sheet 102, while maintaining substantially the same functionality as the non-perforated constraining sheet 102.

Figure 4:
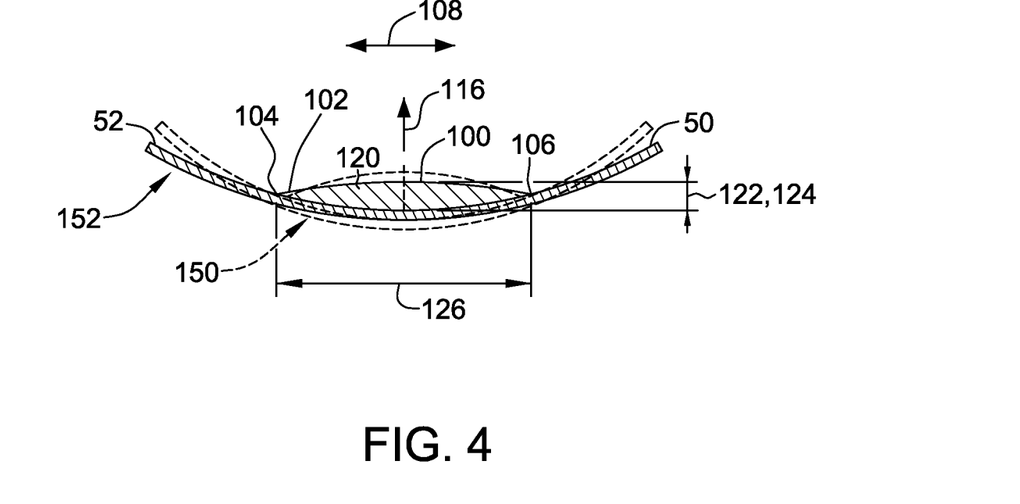
FIG. 4 is a schematic illustration of a cross-section of the conjugate damper of FIG. 2 coupled to the structural panel of FIG. 2 in a compressively deformed state.
Figure 5:
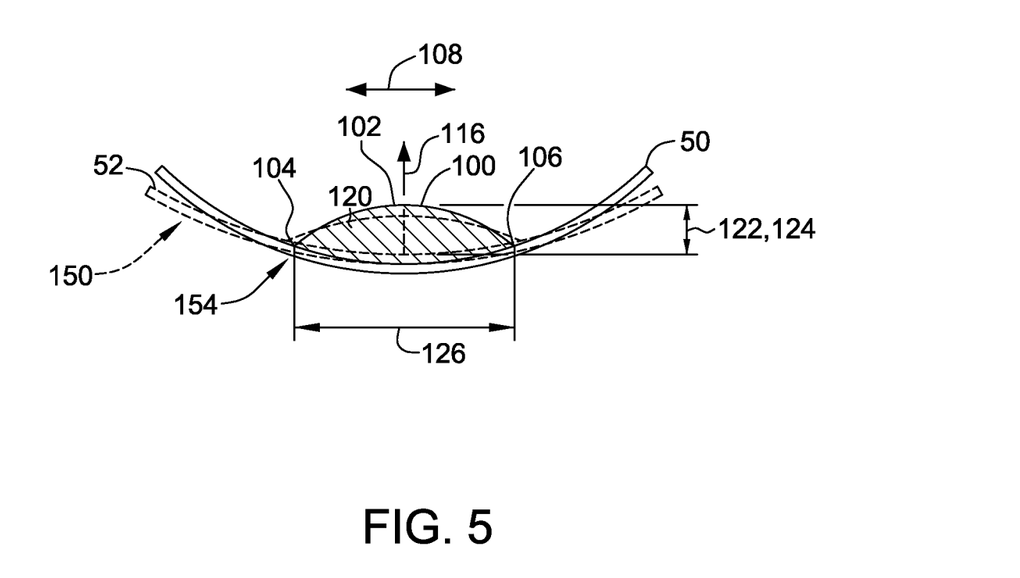
FIG. 5 is a schematic illustration of a cross-section of the conjugate damper of FIG. 2 coupled to the structural panel of FIG. 2 in an expansively deformed state.

For purposes of illustration, the configuration of structural panel 50 and conjugate damper 100 in FIG. 3 will be referred to as a baseline state 150. At least some modes of vibration of structural panel 50 may be characterized as an oscillation relative to baseline state 150 between a compressive deformation of structural panel 50 and an expansive deformation of structural panel 50 for each vibrational cycle. FIG. 4 is a schematic illustration of a cross-section of conjugate damper 100 coupled to structural panel 50 in a compressively deformed state 152, and FIG. 5 is a schematic illustration of a cross-section of conjugate damper 100 coupled to structural panel 50 in an expansively deformed state 154. For clarity of explanation, baseline state 150 (shown in FIG. 3) is represented in dashed lines in FIGS. 4 and 5. It should be noted that the amplitude of deformation of structural panel 50 illustrated in FIG. 4 and FIG. 5 is not intended to be to scale, but rather is exaggerated for clarity of explanation.

With reference to FIG. 4, while structural panel 50 is in compressively deformed state 152 due to vibration, damping layer 120 is subjected to compression stress. More specifically, because first edge 104 and second edge 106 of constraining sheet 102 are coupled to first surface 52, a second distance 126 between first edge 104 and second edge 106 increases along first direction 108, relative to their respective positions in baseline state 150. As a result, constraining sheet 102 is pulled closer to first surface 52, such that first distance 124 decreases. As first distance 124 decreases, thickness 122 correspondingly decreases such that damping layer 120 is compressed between constraining sheet 102 and first surface 52 in a direction generally parallel to surface normal direction 116.

With reference to FIG. 5, while structural panel 50 is in expansively deformed state 154 due to vibration, damping layer 120 is subjected to decompression stress. More specifically, because first edge 104 and second edge 106 of constraining sheet 102 are coupled to first surface 52, second distance 126 between first edge 104 and second edge 106 decreases along first direction 108, relative to their respective positions in baseline state 150. As a result, constraining sheet 102 moves away from first surface 52, such that first distance 124 increases. As first distance 124 increases, thickness 122 correspondingly increases such that damping layer 120 is expanded between constraining sheet 102 and first surface 52 in a direction generally parallel to surface normal direction 116.

Thus, with reference to FIG. 3-5, in certain embodiments, constraining sheet 102 is configured to passively induce deformation in damping layer 120, primarily in surface normal direction 116 and also in shear directions generally parallel to structural surface 52, in response to each vibrational cycle of structural panel 50. Thus, with each vibrational cycle, a first amount of mechanical energy required to compress and expand damping layer 120 is dissipated, and a second amount of mechanical energy required to shear damping layer 120 also is dissipated. The dissipation of the first and second amounts of energy serves to damp the vibration in structural panel 50. Materials such as those described above for damping layer 120 and constraining sheet 102 facilitate damping by conjugate damper 100 over a wide range of temperatures and over a wide range of vibrational frequencies, both non-acoustic and acoustic, of structural panel 50.

Figure 6:
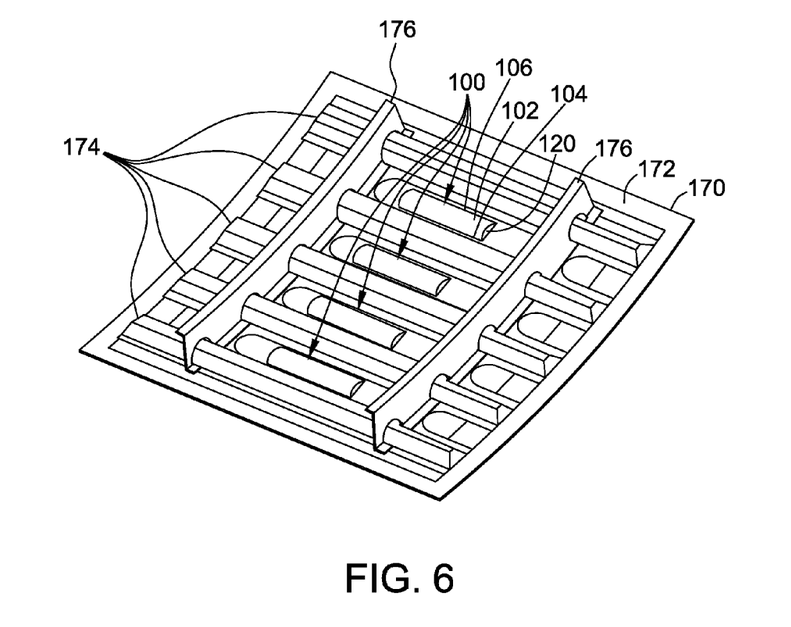
FIG. 6 is a perspective view of a plurality of the conjugate dampers shown in FIG. 2 coupled to a first surface of a structural panel of the aircraft shown in FIG. 1.

FIG. 6 is a perspective view of a plurality of conjugate dampers 100 coupled to a first surface 172 of a structural panel 170 of aircraft 10. More specifically, each conjugate damper 100 includes constraining sheet 102 coupled to first surface 172 along first edge 104 and second edge 106, and each corresponding damping layer 120 is coupled between first surface 172 and the respective constraining sheet 102. Panel 170 includes a plurality of stringers 174 and is traversed by a plurality of frames 176. In the illustrated embodiment, at least one conjugate damper 100 is coupled between each pair of stringers 174. Moreover, each conjugate damper 100 is coupled between a pair of frames 176. The plurality of conjugate dampers 100 facilitates damping non-acoustic and acoustic vibrations in structural panel 170 in the manner described above.

Figure 7:
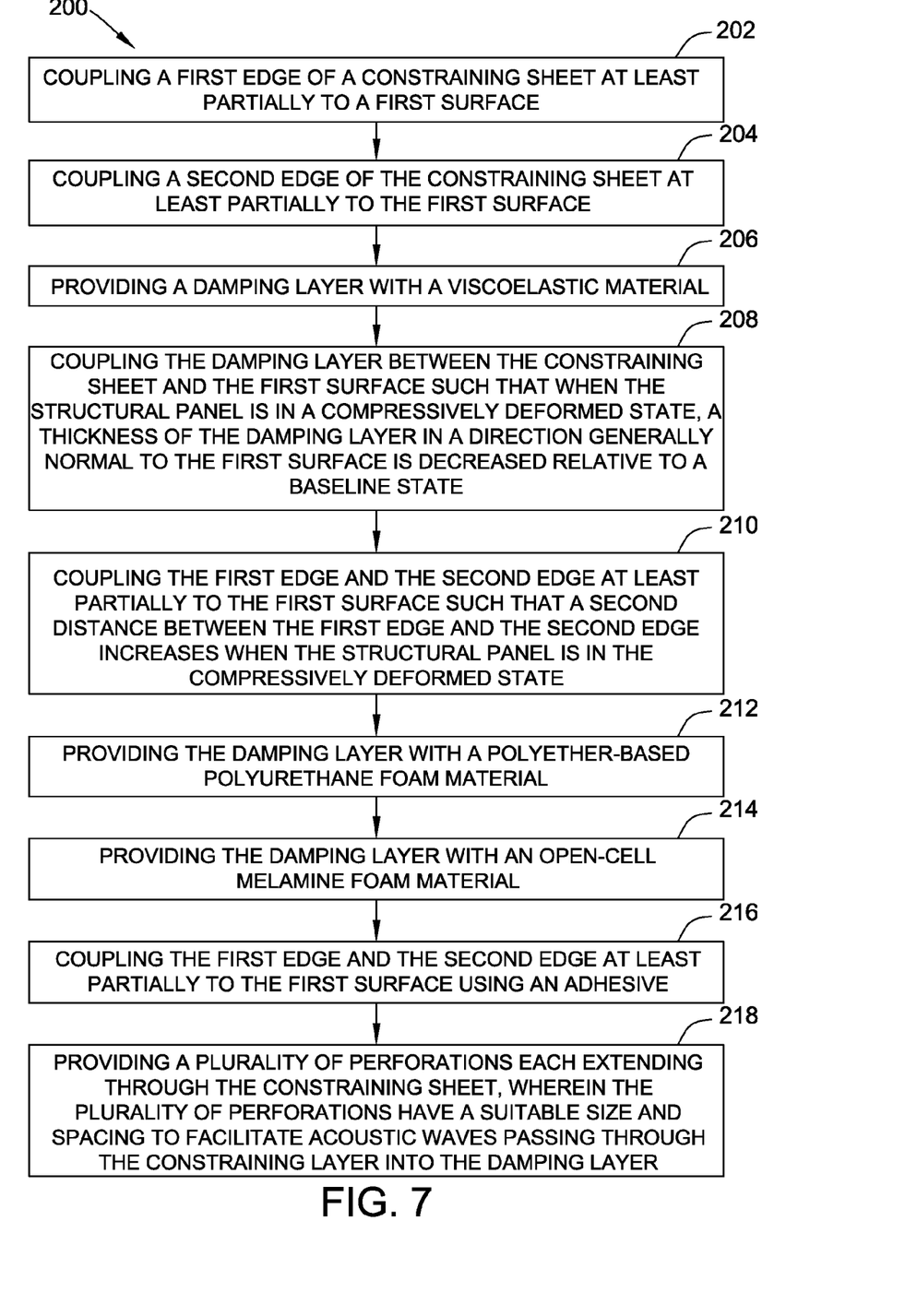
FIG. 7 is a flowchart of an embodiment of a method of reducing structural vibration and noise transmission in a structural panel, such as the structural panels shown in FIG. 2 and in FIG. 6.

FIG. 7 is a flowchart of an embodiment of a method 200 of reducing structural vibration and noise transmission in a structural panel, such as structural panel 50 or structural panel 170. Method 200 includes coupling 202 a first edge of a constraining sheet, such as constraining sheet 102, at least partially to a first surface, such as first surface 52 or first surface 172, of the structural panel. Method 200 also includes coupling 204 a second edge of the constraining sheet at least partially to the first surface, providing 206 a damping layer, such as damping layer 120, with a viscoelastic material, and coupling 208 the damping layer between the constraining sheet and the first surface such that a thickness, such as thickness 122, of the damping layer in a direction generally normal to the first surface, such as surface normal direction 116, varies with a first distance, such as first distance 124, between the constraining sheet and the first surface.

In certain embodiments, method 200 further includes coupling 210 the first edge and the second edge at least partially to the first surface such that a second distance, such as second distance 126, between the first edge and the second edge increases when the structural panel is in a compressively deformed state, and decreases when the structural panel is in an expansively deformed state. Additionally, method 200 alternatively includes providing 212 the damping layer with a polyether-based polyurethane foam material and providing 214 the damping layer with an open-cell melamine foam material. Moreover, in certain embodiments, method 200 includes coupling 216 the first edge and the second edge at least partially to the first surface using an adhesive. Method 200 may additionally include providing 218 a plurality of perforations, such as perforations 128, each extending through the constraining sheet, wherein the plurality of perforations have a suitable size and spacing to facilitate acoustic waves passing through the constraining layer into the damping layer.

Each of the processes of method 200 may be performed or carried out by a system integrator, a third party, and/or a customer. For the purposes of this description, a system integrator may include without limitation any number of aircraft manufacturers and major-system subcontractors; a third party may include without limitation any number of venders, subcontractors, and suppliers; and a customer may be an airline, leasing company, military entity, service organization, and so on. Moreover, although an aerospace example is shown, the principles of the invention may be applied to other industries, such as the automotive industry.

The embodiments described herein provide a method and apparatus for a reduction of both structure-borne vibrations and acoustic noise transmission by a structural panel. The embodiments provide a conjugate damper that induces deformation within a damping layer in a direction generally normal to a panel surface, as well as in directions parallel to the panel surface, in response to a wide range of vibrational frequencies of the panel surface and over a wide range of temperatures.

The embodiments described herein provide improvements over at least some known vibration and noise reduction systems. As compared to at least some known vibration and noise reduction systems, the conjugate damper described herein provides a greater use of the deformation potential of a given weight of damping material, and thus facilitates dissipating an increased proportion of vibrational energy present in the structure. In addition, the conjugate damper includes materials which tend to absorb a wide range of acoustic vibration frequencies. Thus, the embodiments provided herein reduce or eliminate a need for separate devices to damp structure-borne vibration and to absorb acoustic noise. In addition, the methods and apparatus described herein reduce structural vibration and acoustic noise in a passive fashion, with no need for active control systems and actuators.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A conjugate damper for a structural panel, said conjugate damper comprising:
   a constraining sheet extending in a first direction between a first edge and an opposite second edge, and extending in a second direction transverse to the first direction between a third edge and an opposite fourth edge, wherein at least a portion of each of said first edge and said second edge is directly coupled to a first surface of the structural panel, and said third and fourth edges are not directly coupled to the first surface; and
   a damping layer coupled between said constraining sheet and the first surface such that when the structural panel is in a compressively deformed state, a thickness of said damping layer in a direction generally normal to the first surface is decreased relative to a baseline state, wherein a second distance between said first edge and said second edge increases when the structural panel is in the compressively deformed state, said damping layer comprises a viscoelastic material.

2. The conjugate damper according to claim 1, wherein said viscoelastic material comprises a polyether-based polyurethane foam.

3. The conjugate damper according to claim 1, wherein said viscoelastic material comprises an open-cell melamine foam.

4. The conjugate damper according to claim 1, wherein said constraining sheet comprises a sheet of elastic material.

5. The conjugate damper according to claim 1, wherein said constraining sheet comprises aluminum.

6. The conjugate damper according to claim 1, wherein said constraining sheet comprises a plurality of perforations each extending through said constraining sheet, said plurality of perforations have a suitable size and spacing to facilitate acoustic waves passing through said constraining layer into said damping layer.

7. A structural panel for an aircraft, said structural panel comprising:
   a first surface; and
   at least one conjugate damper coupled to said first surface, said at least one conjugate damper comprising:
   a constraining sheet extending in a first direction between a first edge and an opposite second edge, and extending in a second direction transverse to the first direction between a third edge and an opposite fourth edge, wherein at least a portion of each of said first edge and said second edge is directly coupled to said first surface, and said third and fourth edges are not directly coupled to said first surface; and
   a damping layer coupled between said constraining sheet and said first surface such that when said structural panel is in a compressively deformed state, a thickness of said damping layer in a direction generally normal to said first surface is decreased relative to a baseline state, wherein a second distance between said first edge and said second edge increases when said structural panel is in the compressively deformed state, said damping layer comprises a viscoelastic material.

8. The structural panel according to claim 7, wherein said viscoelastic material comprises a polyether-based polyurethane foam.

9. The structural panel according to claim 7, wherein said viscoelastic material comprises an open-cell melamine foam.

10. The structural panel according to claim 7, wherein said constraining sheet comprises a sheet of elastic material.

11. The structural panel according to claim 7, wherein said constraining sheet comprises a thin sheet of aluminum.

12. The structural panel according to claim 7, wherein said constraining sheet comprises a plurality of perforations each extending through said constraining sheet, said plurality of perforations have a suitable size and spacing to facilitate acoustic waves passing through said constraining layer into said damping layer.

13. A method of reducing structural vibration and noise transmission in a structural panel, said method comprising:
   coupling at least a portion of a first edge of a constraining sheet directly to a first surface of the structural panel;
   coupling at least a portion of a second edge of the constraining sheet directly to the first surface, wherein the constraining sheet extends in a first direction between the first edge and the second edge, and extends in a second direction between a third edge and an opposite fourth edge, and wherein the third and fourth edges are not directly coupled to the first surface;

providing a damping layer with a viscoelastic material; and coupling the damping layer between the constraining sheet and the first surface such that when the structural panel is in a compressively deformed state, a thickness of the damping layer in a direction generally normal to the first surface is decreased relative to a baseline state, wherein a second distance between the first edge and the second edge increases when the structural panel is in the compressively deformed state.

14. The method according to claim 13, wherein said providing the damping layer with a viscoelastic material further comprises providing the damping layer with a polyether-based polyurethane foam material.

15. The method according to claim 13, wherein said providing the damping layer with a viscoelastic material further comprises providing the damping layer with an open-cell melamine foam material.

16. The method according to claim 13, wherein said coupling the first edge and the second edge, respectively, further comprises coupling the first edge and the second edge using an adhesive.

17. The method according to claim 13, further comprising providing a plurality of perforations each extending through the constraining sheet, wherein the plurality of perforations have a suitable size and spacing to facilitate acoustic waves passing through the constraining layer into the damping layer.

* * * * *